United States Patent [19]

Haynes

[11] 4,379,891

[45] Apr. 12, 1983

[54] MULTIFUNCTIONAL COUPLING AGENT

[75] Inventor: George R. Haynes, Houston, Tex.

[73] Assignee: Shell Oil Company, Houston, Tex.

[21] Appl. No.: 274,111

[22] Filed: Jun. 15, 1981

[51] Int. Cl.³ .............................................. C08F 36/06
[52] U.S. Cl. .................................... 525/342; 526/335
[58] Field of Search ............... 525/105, 342; 526/335, 526/340.2, 340.4

[56] References Cited

U.S. PATENT DOCUMENTS

| | | | |
|---|---|---|---|
| 3,244,664 | 4/1966 | Zelinski et al. | 260/41.5 |
| 3,281,383 | 10/1966 | Zelinski et al. | 260/23.7 |
| 3,594,452 | 7/1971 | DeLaMare et al. | 260/880 |
| 3,766,301 | 10/1973 | DeLaMare et al. | 260/879 |
| 3,880,954 | 4/1975 | Kahle et al. | 260/879 |
| 3,985,830 | 10/1976 | Fetters et al. | 260/880 B |
| 4,076,915 | 2/1978 | Trepka | 525/342 |
| 4,104,332 | 8/1978 | Zelinski | 260/880 B |
| 4,137,391 | 1/1979 | Smith et al. | 525/342 |
| 4,185,042 | 1/1980 | Verkouw | 525/342 |
| 4,243,767 | 1/1981 | Kaufman et al. | 525/342 |
| 4,296,008 | 10/1981 | St. Clair et al. | 525/105 |

FOREIGN PATENT DOCUMENTS 1014999 12/1965 United Kingdom .

Primary Examiner—Paul R. Michl

[57] ABSTRACT

Lithium metal-terminated polymers of one or more alkadienes and of one or more monoalkenyl arenes are coupled by reaction with a coupling agent of the general formula $$(R_1O)_3Si\text{-}R_2\text{-}O\text{-}R_2\text{-}Si\text{—}O\text{-}R_1)_3$$

where $R_1$ is an alkyl group of 1 to 4 carbon atoms and $R_2$ is an alkyl group of 2 to 10 carbon atoms.

10 Claims, No Drawings

MULTIFUNCTIONAL COUPLING AGENT

BACKGROUND OF THE INVENTION

The coupling of lithium metal-terminated polymers is a process known in the art. In accordance with this known process, a lithium metal-terminated polymer is treated with a compound having two or more functional groups containing two or more reactive sites capable of reacting with the carbon-lithium metal bonds of the lithium metal-terminated polymer. In many cases the multifunctional coupling agent thereby becomes a nucleus for the resulting structure. From this nucleus long chain polymeric branches radiate and such coupled polymers have specific properties that render them useful for particular applications.

Linear polymers are formed by employing coupling agents having two reactive sites. One type of coupling agent employed in forming linear polymers is a dihalo alkane such as dibromoethane. See G. B. No. 1,014,999. Another coupling agent employed in making linear polymers is phenyl benzoate as disclosed in U.S. Pat. No. 3,766,301. Radial polymers are formed by employing coupling agents having more than two reactive sites. Examples of such coupling agents include among others: $SiCl_4$—U.S. Pat. No. 3,244,664; Polyepoxides, polyisocyanates, polyimines, polyaldehydes, polyketones, polyanhydrides, polyesters, polyhalides—U.S. Pat. No. 3,281,383; Diesters—U.S. Pat. No. 3,594,452; Methoxy silanes—U.S. Pat. No. 3,880,954; Divinyl benzene—U.S. 3,985,830; 1,3,5-benzenetricarboxylic acid trichloride—U.S. Pat. No. 4,104,332; and glycidoxymethoxy silanes—U.S. Pat. No. 4,185,042.

A new coupling agent has now been discovered that results in polymers having good coupling efficiencies along with an excellent property balance in footwear compositions.

SUMMARY OF THE INVENTION

The present invention broadly encompasses a process for the production of a polymer comprising reacting a living lithium-terminated polymer having the formula P-Li wherein P is selected from the group consisting of polymer chains of one or more alkadienes having 4–12 carbon atoms and copolymer chains of one or more alkadienes having 4–12 carbon atoms and one or more monoalkenyl arenes of 8–18 carbon atoms, having the alkenyl radical attached to an arene ring carbon atoms, with a coupling agent of the general formula

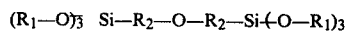

$(R_1-O)_3 Si-R_2-O-R_2-Si(-O-R_1)_3$ where $R_1$ is an alkylene group of 1 to 4 carbon atoms and $R_2$ is an alkylene group of 2 to 10 carbon atoms.

The coupling agents according to the present invention have a number of advantages. For one, the associated coupling efficiency is greater than 95%, which is a very high coupling efficiency. Further, compositions made with the resulting polymer have a much improved tear strength, tensile strength and flex crack resistance when compared to compositions containing polymers made with other methoxy silane coupling agents, such as gama-glycidoxypropyl-trimethoxy silane (GPTS).

The coupled polymers of the invention also have better heat stability than GPTS coupled materials. Thus, the subject polymers can be finished without significant degradation under conditions which appreciably degrade the GPTS coupled polymers. The heat stability test included heating about 0.5 gram samples sealed in aluminum sheet for two minutes at 425°–475° F. The greater heat stability will also result in less degradation during compounding and molding operations.

DETAILED DESCRIPTION OF THE INVENTION

The preferred group of acyclic conjugated alkadienes that can be polymerized into the polymer chain P are those containing 4–8 carbon atoms. Examples for such alkadienes are 1,3-butadiene, 2,3-dimethyl-1,3-butadiene, piperylene, 3-butyl-1,3-octadiene, isoprene, 2-phenyl-1,3-butadiene.

Monoalkenyl arenes that can be polymerized together with the alkadienes to form the polymer chain P preferably are those selected from the group of styrene, the methylstyrenes, particularly 3-methylstyrene, the propylstyrenes, particularly 4-propylstyrene, vinylnapthalene, particularly 1-vinylnapthalene, cyclohexylstyrenes, particularly 4-cyclohexylstyrene, p-tolylstyrene, and 1-vinyl-5-hexylnaphthalene.

The polymer chains P can be homopolymers of the alkadiene monomers defined or can be copolymers of alkadiene monomers and monoalkenyl-substituted aromatic monomers. These copolymers, in turn, can be random or tapered copolymers, as well as block copolymers of these various monomers. The presently preferred monomers are isoprene, 1,3-butadiene and styrene. The presently preferred polymer chains P are those in which the conjugated dienes are present in a major amount and the monovinyl-substituted arenes are present in a minor amount.

The presently preferred polymer is one that is obtained by coupling a living lithium metal-terminated polymer selected from the group consisting of homopolymers of alkadienes have 4 to 12 carbon atoms and copolymers of at least one alkadiene of 4 to 12 carbon atoms.

The molecular weight of the polymers of this invention can vary in broad ranges. For the usual applications of the coupled polymers, the number average molecular weight will be in the range of about 6,000 to about 2,000,000.

Those polymers in which the polymer chain P has a structure A - - B - - - so that B is attached to the coupling agent, and in which A represents a block of monoalkenylarenes, preferably a polystyrene block, and B represents a block that confers rubbery properties to the polymer chain, such as a polyalkadiene block, a copolymer block of an alkadiene and a monoalkenyl-substituted arene, or a combination of such blocks constitutes a presently preferred polymer. Such a polymer exhibits properties both of an elastomer and of a thermoplastic polymer. Therefore, such polymers can be formed into articles by standard procedures known for producing articles from thermoplastic polymers while the finished article exhibits elastomeric properties.

Furthermore, specific polymers constituting preferred embodiments of this invention are those obtained by reactions and procedures disclosed in detail in the following description of a process to make these polymers.

In accordance with another embodiment of this invention, there is provided a process for making the polymers defined above which comprises a coupling reaction between a living polymer having the formula P-Li and a coupling agent as defined above, wherein Li is lithium metal and P is as described above.

The quantity of coupling agent employed with respect to the quantity of living polymers P-Li present depends largely upon the degree of coupling and the properties of the coupled polymers desired. Preferably the coupling agent defined above will be employed in a range of about 0.1 to about 0.5 preferably about 0.2 to about 0.3 moles of coupling agent based upon the moles of lithium metal present in the polymer. The number of arms obtained for the coupled polymers depend upon the ratio of coupling agent to lithium in the living polymer. About 0.2 moles of coupling agent per mole lithium will generally give largely 4 arms, with some 3-arm and some greater than 4 arm polymers also. About 0.3 moles coupling agent per mole lithium will give mostly 3- and 4-arm polymers.

As stated above, the coupling agent of the present invention is a silane having the general formula:

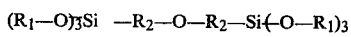
$(R_1-O)_3Si-R_2-O-R_2-Si(-O-R_1)_3$ where $R_1$ is an alkylene group of 1 to 4 carbon atoms and $R_2$ is an alkylene group of 2 to 10 carbon atoms. Preferably, $R_1$ is a methyl group and $R_2$ is a propylene group. Therefore, the preferred coupling agent is 3,3'-oxydipropylbis(trimethoxy silane), which has the formula:

$(CH_3O)_3SiCH_2CH_2CH_2OCH_2CH_2CH_2Si(OCH_3)_3.$

The temperature at which the coupling reaction is carried out can vary over a broad range and, for convenience, often is the same as the temperature of polymerization. Although the temperature can vary broadly from about 0° to 150° C., it will preferably be within the range from about 20° C. to 100° C.

The coupling reaction is normally carried out by simply mixing the coupling agent, neat or in solution, with the living polymer solution. The reaction period is usually quite short. The normal duration of the coupling reaction will be in the range of 1 minute to 1 hour. Longer coupling periods may be required at lower temperatures.

After the coupling reaction, the coupled polymers are recovered by treating the reaction mixture with terminating agents containing active hydrogens such as alcohols or water or aqueous acid solutions or mixtures thereof. It is usually preferred to add an antioxidant to the reaction mixture before isolation of polymer.

The polymer is separated from the reaction mixture by standard techniques, such as steam stripping or coagulation with a suitable nonsolvent such as an alcohol. The coagulated or stripped polymer is then removed from the resulting medium by, e.g., centrifugation or extrusion. Residual solvent and other volatiles can be removed from the isolated polymer by heating, optionally under reduced pressure or in a forced air flow.

In accordance with a further embodiment of this invention, there is provided a process for producing the polymers as defined above. This process includes basically two steps. The first step is the step in which a living polymer having the formula P-Li is produced. The second step is that in which this living polymer is coupled with the coupling agent of this invention as defined above.

The first step of this process is carried out by reacting a mono-functional lithium metal initiator system with the respective monomer or monomers to form the living polymer chain P-Li. This polymerization step can be carried out in one step or in a sequence of steps. In the case where the polymer chain P is a homopolymer or a random or tapered copolymer of two or more monomers, the monomers are simultaneously polymerized with the lithium metal initiator. In the case where the polymer chain P is a block copolymer comprising two or more homo- or copolymer blocks, these individual blocks can be generated by incremental or sequential monomer addition.

The monomers that are generally employed, as well as the monomers that are preferably used have been defined above in connection with the novel polymers of this invention. These monomers are also preferred for the process of the present invention.

The lithium metal-based initiator systems used in the first step of the process to make the coupled polymers of this invention are based on lithium having the general formula R'Li wherein R' is a hydrocarbyl radical of 1 to about 20 carbon atoms. Examples of such lithium initiators are methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, and 4-cyclohexylbutyllithium. The amount of the lithium metal initiator employed depends upon the desired properties of the polymer, particularly the desired molecular weight. Normally, the organomonolithium initiator is employed in the range of about 0.1 to 100 gram millimoles per 100 grams of total monomers.

The polymerization reaction is carried out in the presence of a hydrocarbon diluent. Preferably the hydrocarbon diluent is a paraffinic, cycloparaffinic or aromatic hydrocarbon having 4-10 carbon atoms or a mixture of such diluents. Examples for the diluent are n-hexane, n-heptane, 2,2,4-trimethylpentane, cyclohexane, benzene and toluene. The reaction is generally carried out with a weight ratio of diluent to monomers exceeding 1. Preferably the diluent is employed in a quantity between about 400 to about 1500 parts by weight per 100 parts by weight of total monomers.

The polymerization reaction in step 1 usually occurs within a period of time ranging from a few minutes up to about 6 hours. Preferably, the reaction is carried out within a time period of about 10 minutes to about 2 hours. The polymerization temperature is not critical and will generally be in the range of about 15° to about 150° C., preferably in a range of about 40° to about 90° C.

At the conclusion of the polymerization in order to carry out the second or coupling step, the polymerization mixture is blended with the coupling agent. This is done before any material that would terminate the polymerization reaction and that would remove the lithium metal atom from the polymer chain is added to the reaction mixture. Thus the blending of the polymerization mixture and the coupling agent is carried out before any material such as water, acid or alcohol, is added to inactivate the living polymer. The second step of coupling the living polymer is thus carried out as described in detail above.

Various materials are known to be detrimental to the lithium metal-initiated polymerization. Particularly, the presence of carbon dioxide, oxygen, water and alcohols should be avoided during an organomonolithium-initiated polymerization reaction of step 1 of this combined process for making the coupled copolymers.

Therefore, it is generally preferred that the reactants, initiators and the equipment be free of these materials and that the reaction is carried out under an inert gas such a nitrogen.

In accordance with a further embodiment of this invention, styrene-butadiene block copolymers prepared according to the above process are compounded with various other ingredients, therein forming compositions eminently suitable for footwear applications. These footwear compositions generally comprise a block copolymer component (i.e., the polymer according to the present invention), a thermoplastic polymer component, plasticizers, and fillers.

An important blending component is the thermoplastic polymer. In the present specification and claims, the term "thermoplastic polymer" is distinguished from the term "thermoplastic elastomer" or "thermoplastic rubber" in that the thermoplastic polymers are defined as nonelastomeric polymers. These thermoplastic polymers have the generally well-known characteristics of ordinary thermoplastics and include poly(styrene), poly(ethylene), poly(propylene) and copolymers of ethylene and vinyl acetate. The amount of thermoplastic polymer typically employed varies from about 5–150 phr, preferably about 50–115 phr. The term "phr" is well known, and means parts by weight per 100 parts by weight rubber (or block copolymer as in the present case).

Plasticizers are also employed in the compositions. Preferred plasticizers are hydrocarbon rubber extending oils. These hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX ® oils, Nos. 310, 371 and 311 (which is a blend of 310 and 371). The amount of extending oil employed varies from about 5–175 phr, preferably from about 50–160 phr.

Additional resins are also employed in the present compositions. The additional resins employed herein are high softening point resins that are compatible with the monoalkenyl end blocks of the block copolymer and include polymers of alphamethyl styrene, copolymers of alphamethyl styrene and vinyltoluene, coumaroneindene resins, polyindene resins, and poly(methyl indene) resins. The amount of end block compatible resin employed varies from about 0–90 phr, preferably 5–40 phr.

The fillers used in the present compositions are well known in the art and include clay, talc, titanium dioxide, carbon blacks, calcium carbonate, silica, and other pigments as well as fibrous fillers such as cellulosic fibers, sawdust, ground cork, etc. Preferred fillers include clay, talc, silica and calcium carbonate. The amount of filler employed varies from 0–150 phr, preferably 5–110 phr. Additional minor amounts of antioxidants, ultra-violet stabilizers, fire retardants and the like may also be added.

The various components may be mixed together in a variety of processes. One preferred process is the dry blending process of U.S. Pat. No. 4,060,510, the disclosure of which is herein incorporated by reference.

The invention is further illustrated by reference to the following Illustrative Embodiments which are given for the purposes of illustration only, and are not meant to limit the invention to the particular reactant and conditions employed therein.

ILLUSTRATIVE EMBODIMENT I

A precursor block copolymer was prepared in cyclohexane solvent utilizing sec-butyl lithium as the initiator by first polymerizing styrene at 30°–60° C. to form a polystyrene block and thereafter injecting butadiene to form a butadiene block, the living block copolymer so formed then having the structure polystyrene-polybutadiene-lithium. It was determined that this precursor block copolymer had average molecular weights in the polystyrene block of about 13,000 and that the polybutadiene block had an average molecular weight of about 25,000. A portion of the precursor block copolymer was reacted for 20 minutes at 60° C. with 0.22 gram-moles of 3-3'-oxydipropylbis(trimethoxy silane) referred to as ("ODPTS") for 0.90 gram-moles of lithium. About 95 to 98% of the intermediate polymer (polystyrene-polybutadiene-lithium) was coupled to form the desired end product. The end product had a total molecular weight (calculated from polystyrene equivalent) of about 160,000 and a functionality of about 4.

ILLUSTRATIVE EMBODIMENT II

The polymer from Illustrative Embodiment I was then compounded in a footwear formulation with a hydrocarbon extending oil, silica filler, a dimethyl adipate-coupled styrene-butadiene block copolymer, high density polyethylene, flock and an antioxidant/uv stabilizer package. This formulation was then compared with a similar formulation containing identical ingredients and amounts except for the silane coupled styrene-butadiene block copolymer. The styrene-butadiene block copolymer employed for comparison purposes was prepared with a gamma-glycidoxypropyl-trimethoxy silane (GPTS) coupling agent. The results are presented below in Table I.

TABLE I

| Compound properties of Polymer | | |
|---|---|---|
| Test | Polymer made with GPTS coupling agent (control) | Polymer made with ODPTS coupling agent (according to the invention) |
| Melt Flow, Cond. E, g/10 min. | 13.8 | 7.4 |
| Hardness, Shore A, compression molded, Inst./10 sec. | 53/51 | 55/54 |
| Stiffness, Tinius Olsen, psi | 664 | 861 |
| Tear Strength, trouser, ∥/⊥, pli | 45/47 | 60/70 |
| Flex Crack Resistance, kc to 500% growth | 734 | 1481 |
| Taber Abrasion, cm$^3$ loss/kc | 0.4428 | 0.3363 |
| Adhesion (peel strength), pli | 37 | 39 |
| Tensile Strength, ∥/⊥, psi | 410/435 | 586/624 |
| Elongation, ∥/⊥, % | 620/660 | 715/760 |
| 300% Modulus, ∥/⊥, psi | 278/200 | 235/203 |
| Set, ∥/⊥, % | 17/15 | 18/18 |

The above data were obtained using polymers having equivalent coupling yields. The lower flow for the ODPTS polymer reflects its greater number of arms (4) compared to about 3.2 for the GPTS coupled polymer. The greater strength properties for the ODPTS coupled polymer is shown in the flex crack resistance, which is twice that for the GPTS coupled polymer, and in the about 40% improvement in tear strength and tensile strength.

The smaller loss from abrasion for the ODPTS coupled polymer (only 76% of that for the GPTS coupled polymer) indicates better wear properties and longer service life. The greater elongation for ODPTS coupled material shows that it can be stretched further without breaking. These properties all contribute toward a better wearing, longer lasting finished product in use.

What is claimed is:

1. A process for the production of a polymer comprising reacting a living lithium-terminated polymer having the formula P-Li wherein P is selected from the group consisting of polymer chains of one or more alkadienes having 4–12 carbon atoms and copolymer chains of one or more alkadienes having 4–12 carbon atoms and one or more monoalkenyl arenes of 8–18 carbon atoms, having the alkenyl radical attached to an arene ring carbon atom, with a coupling agent of the general formula

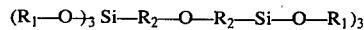

wherein $R_1$ is an alkyl group of 1 to 4 carbon atoms and $R_2$ is an alkylene group of 2 to 10 carbon atoms.

2. The process according to claim 1 wherein said alkadiene is selected from the group consisting of isoprene and butadiene and said monoalkenyl arene is styrene.

3. The process according to claim 1 wherein P is a polymer chain of one or more alkadienes selected from the group consisting of butadiene and isoprene.

4. The process according to claim 1 wherein P is a block copolymer of styrene and butadiene with the butadiene block being attached to the lithium ion.

5. The process according to claim 1 where $R_1$ is a methyl group and $R_2$ is a propylene group.

6. The process according to claim 4 where $R_1$ is a methyl group and $R_2$ is a propylene group.

7. The polymer produced by the process of claim 5 or 6.

8. The polymeric composition comprising the polymer produced by the process of claim 4, a thermoplastic polymer, a filler and a plasticizer.

9. The composition of claim 4 wherein said thermoplastic polymer is high density polyethylene, said filler is silica and said plasticizer is a hydrocarbon extending oil.

10. The composition of claim 4 or 9 wherein the amount of said thermoplastic polymer is 25 to 250 phr, the amount of said filler is 10 to 110 phr, and the amount of said plasticizer is 5 to 175 phr.

* * * * *